United States Patent

[11] 3,625,834

[72] Inventor Hans Muller
 Allmendli I, Erlenbach/Zuerich, Switzerland
[21] Appl. No. 816,747
[22] Filed Apr. 16, 1969
[45] Patented Dec. 7, 1971
[32] Priority July 4, 1966
[33] Switzerland
[31] 9772/66
 Original application July 3, 1967, Ser. No. 651,054, now Patent No. 3,460,810. Divided and this application Apr. 16, 1969, Ser. No. 816,747

[54] METHOD OF MIXING GASEOUS AND LIQUID PHASES
 5 Claims, 2 Drawing Figs.
[52] U.S. Cl. .................................................. 195/109, 195/142, 195/143, 195/1, 261/36, 261/93
[51] Int. Cl. ..................................................... C12b 1/14, B01f 3/04
[50] Field of Search .......................................... 195/109, 142, 143; 261/36, 77, 93

[56] References Cited
UNITED STATES PATENTS

| | | | |
|---|---|---|---|
| 1,982,002 | 11/1934 | Hatch............................ | 195/143 UX |
| 2,151,126 | 3/1939 | Lockey.......................... | 195/143 UX |
| 2,364,686 | 12/1944 | Balisteri et al. ............... | 261/36 |
| 3,323,249 | 6/1967 | Randall ......................... | 261/36 |

Primary Examiner—Alvin E. Tanenholtz
Attorney—Michael S. Striker

ABSTRACT: A mixing method. A crude mixture of a gaseous and a liquid phase is contained in an elongated tubular inner space and in an annular outer space surrounding and communicating with the inner space. Jets of the mixture are forced from the inner into the outer space at longitudinally spaced locations of the inner space, and their intrusion into and dispersion in the mixture in the outer space effects more intimate admixture of the phases.

METHOD OF MIXING GASEOUS AND LIQUID PHASES

CROSS-REFERENCE TO RELATED APPLICATION

The present invention is a division of my copending application, filed on July 3, 1967 under Ser. No. 651,054; now U.S. Pat. No. 3,460,810.

BACKGROUND OF THE INVENTION

The present invention relates to mixing in general, and more particularly to the mixing of liquid and gaseous phases. Still more particularly, the present invention relates to a method of intimately admixing a liquid phase and a gaseous phase.

It is frequently necessary to effect intimate admixture of two or more components in a very short period of time and with maximum intimacy. This is particularly required in fermentation processes where, as is well known, it is required to thus admix two or more components, which are not soluble one in the other. To effect fast admixture and to achieve maximum intimacy of mixing of the components, it is necessary that a very large surface area be available for each of the components. On the other hand, however, it is also necessary that the particles of the components which are being admixed with one another be able to remain in contact for a relatively long period of time. In fermentation processes, which are based on the action of micro-organisms the conversion of the mixture into the desired product may take anywhere from 1 hour to 100 hours, depending on the particular process involved. Therefore, it is necessary that the admixture of the various components be effected not only quickly and intimately, as set forth above, but also that the particles of the various components be maintained in contact for a relatively long period of time.

Attempts have been made in the prior art to provide processes and devices for obtaining these desired results. However, none of these have been entirely satisfactory, and this is particularly true in circumstances where the fluids to be admixed with one another comprise two phases which are widely divergent in their specific gravity. Under these circumstances, in particular, the devices known from the prior art permit the phase having the lighter specific gravity to float on the phase having the higher specific gravity, only the latter phase being agitated while the device fails to admix the lighter gravity phase with it. This is a particularly serious disadvantage in view of the fact that the trend in fermentation processes recently is more and more towards such two-phase fluids which it has heretofore not been possible to satisfactorily admix, as set forth above, for the reasons just mentioned.

SUMMARY OF THE INVENTION

The present invention overcomes these disadvantages just outlined.

More particularly, the present invention provides a method which is particularly suitable for intimately admixing a liquid phase and a gaseous phase with one another.

The method in accordance with the present invention effects not only a highly intimate admixture of the two phases with one another, but also effects such intimate admixture quickly while yet affording maximum contact between the particles of the thus-admixed phases.

The present invention is suitable for both batch type and for continuous operation.

In accordance with one feature of my invention, I provide a method according to which I confine a coarse mixture of the two phases to be mixed in two communicating areas, one of which surrounds the other. Thereupon, I subject the coarse mixture thus confined in the aforementioned other area to an agitation which is requisite for ejecting jets of the mixture from the other area with a predetermined orientation into the aforementioned one area. Once these jets have been thus ejected into the one area which, it will be understood, is also filled with the coarse mixture, the predetermined orientation of the jets is changed and thereby conversion of the crude mixture of the jets into an intimate mixture of the phases is effected because the jets are dispersed in the crude mixture contained in the one area.

The novel features which are considered as characteristic for the invention are set forth in particular in the appended claims. The invention itself, however, together with additional objects and advantages thereof, will be best understood from the following description of two specific embodiments of apparatus for carrying out my method, when read in connection with the accompanying drawing.

DESCRIPTION OF THE PREFERRED EMBODIMENTS

Figure 1:
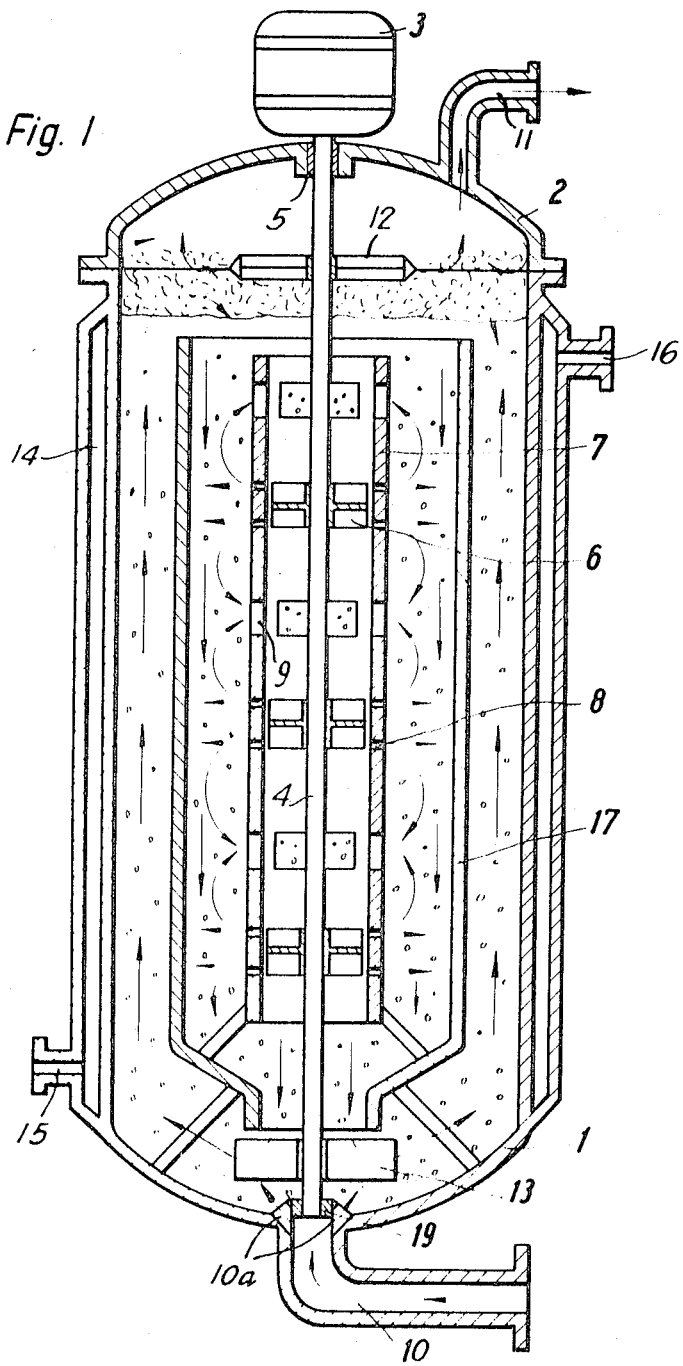
FIG. 1 is a vertical section through an apparatus for carrying out my novel method in a first embodiment.

Discussing now the drawing in detail, and firstly FIG. 1, it will be seen that in the there-illustrated embodiment I show a container or receptacle 1 which is arranged substantially vertically and whose upper open end is closed by a cover 2. Extending axially through the container 1 is an elongated shaft 4 which is supported in a bearing 5 provided in the cover 2 and in a similar bearing 19 provided in the bottom portion of the container 1.

The shaft 4 has connected thereto for rotation therewith a plurality of mixing elements in form of wheels, paddles, or the like, which are identified with reference numerals 6, and which are vertically spaced from one another. Drive means, generally indicated with reference numeral 3, is connected with the shaft 4 for rotating the same about its longitudinal axis.

The shaft 4, together with the mixing elements or agitating elements 6 carried thereby, is surrounded by a tubular baffle 7 which is provided with a plurality of orifices 8, these orifices being arranged in sieve like manner opposite each of the agitating elements 6. Intermediate consecutive ones of these agitating elements 6 the tubular baffle 7 is further provided with apertures 9 whose cross-sectional area, as can be seen from FIG. 1, is substantially larger than the cross sectional area of the orifices 8.

The baffle 7 is in turn surrounded with spacing by a tubular wall 17.

The receptacle 1 is adapted to contain a mixture of components, which will be assumed to be a liquid and a gaseous phase in this instance, to the upper level clearly visible in the drawing. A dispersing member 12 in form of paddles or a similar arrangement is carried by the shaft 4 for rotation therewith in the region just above the upper level of the mixture because, during operation of the novel mixer herein disclosed, a zone of foam will form which floats on this upper level and which is intended to be dispersed by the member 12 so that it will be prevented from filling entirely the space in cover 2 above the level of the mixture. Such dispersing members are known in the art and need not be further described, just as the rotating agitating elements 6 are themselves known to those skilled in this field.

Downwardly below the open end defined by the outer wall 17 the shaft 4 carries for rotation therewith an additional instrumentality, such as an agitating wheel or the like, which is identified with reference numeral 13 and which serves to axially draw the mixture out of the space located within the confines of the walls 17 and 7 and to thereupon radially distribute this mixture so that it will flow upwardly on the outside of the wall 17, between the same and the peripheral wall of the container 1, as indicated by the arrows. This radial and subsequently upward flow is aided by the fact that the bottom wall of the container 1 is upwardly curved as clearly evident from FIG. 1. An inlet conduit 10 communicates with the container 1 at the bottom thereof through the openings 10a or in a similar manner, and the gaseous phase necessary for the fermentation process, such as air, oxygen, or gases necessary for nourishment of the micro-organisms is introduced through this conduit 10 into the interior of the container 1. The non used excess gas, and the gaseous reaction products are permitted to escape or are withdrawn through an outlet conduit 11 provided in the cover 2. In the illustrated embodiment the container 1 is provided with a double peripheral wall whereby I obtain a peripheral jacket 14 with which the conduits 15 and 16 communicate so that I can introduce a cooling medium or a heating medium into this jacket 14, and can remove it, quite as desired and necessary in accordance with the particular requirements encountered. In this context, it will be understood of course, that in certain of the fermentation processes, relatively large amounts of heat are developed which must be withdrawn quickly because elevated temperatures disturb the biological processes taking place during fermentation. Thus, if the heat-exchanging surface afforded by the inner wall of the container 1 in the region of the jacket 14 is not sufficient for this purpose, I can provide additional heat-exchanging opportunities by constructing either or both of the walls 7 and 17 as heating and/or cooling jackets similar to the jacket 14, or in form of tubing coils, it being evident that heating and/or cooling medium can be circulated through these additional jackets in the same manner in which this is accomplished with the jacket 14.

The embodiment illustrated in FIG. 1 is basically intended for batch-type operation. However, by the simple expedient of providing an inlet and an outlet for the liquid phase it can be converted to continuous operation. The principle of operation of the embodiment in FIG. 1 will be clear and need therefore be only briefly summarized. The container 1 is filled to the desired level with the liquid phase, the cover 2 is put into position, and the drive means 3 then rotates the shaft 4 and the associated elements 6, 12 and 13 and the longitudinal axis of the shaft 4. The agitating members 6 aspirate the crude mixture, which enters through the openings 9 and through the open top and bottom ends of the baffle 7, and is ejected radially at great speed and with considerable force in form of jets through the orifices 8 in the direction towards the inner wall surface of the wall 17. The member 13 draws the crude mixture axially out of the confines of the baffle 7 and the wall 17, as already mentioned before and as illustrated by the downwardly directed arrows in FIG. 1, and thereupon circulates this mixture radially for upward flow in the space between the wall 17 and the peripheral wall of the container 1, as illustrated by the upwardly directed arrows. At the upper end of this space, the mixture again reverses direction, as also indicated by the curved arrows, and is again drawn back into the confines of the baffle 7 and the wall 17. Foam which develops at and above the upper level of the mixture is dispersed by the member 12 and is thus prevented from filling the space within the cover 2 and from entering into the outlet conduit 11. The jets ejected through the orifices 8 impinge on the inner wall surface of the wall 17 from which they rebound. Passage of the jets through the mixture circulating through the space between the baffle 7 and the inner wall surface of wall 17, and impingement of the jets on this inner wall surface and subsequent dispersal of the jets result in intimate admixture of the tube faces and information of a multitude of tiny gas bubbles which remain for a relatively long period of time. Thus, a highly intimate mixture is obtained. It will be understood, of course, that the gaseous phase coming in through the conduit 10 rises upwardly, as indicated by the arrows in the space between the wall 17 and peripheral wall of the container 1, and is then drawn out of the space above the level of the crude mixture into the confines of the baffle 7 and the wall 17.

Operation of the device produces a milky looking emulsion whose volume is greater than the volume of the liquid phase itself because of its high gas content. It is to be understood that the gas must by no means be added under pressure in all circumstances because under pressure exists at certain points of the device at which the gas can be aspirated by suction. Thus, the gas can be aspirated downwardly out of the space above the level of the mixture. Tests have shown that the mixture of gaseous and liquid phase is always passed on to the next lower or next higher member 6 so that the gaseous phase is distributed very evenly and very rapidly and frequently at a pace which is faster than additional liquid phase introduced into the container. If the speed of admixture and the equality of admixture is to be still further improved, particularly if the speedy and equal admixture of added liquid phase is to be improved, an additional circulating conduit can be provided which, in conjunction with the member 13, serves to constantly circulate the contents of the container 1 within, and if desired, without, the container.

As already mentioned before, the outlet conduit 11 is provided for withdrawing excess gas and also for withdrawing gaseous fermentation products. Such withdrawal must be continuous but, because of the highly effective admixing afforded by the novel device, could result in the loss of a relatively great percentage of liquid phase which would leave the container with the gas being withdrawn. This is avoided by providing the foam-dispersing member 12 and by keeping the level of the crude mixture in the region of this member 12. Furthermore, it is advisable to maintain the temperature of the fermenting mixture as precisely as possible at a predetermined level because the volume increase of the mixture and thereby the elevation of its upper level depends from the temperature, among other factors. This is the reason for the provision of the heating and/or cooling jacket 14 which, incidentally, also makes the device disclosed herein suitable for purposes other than fermentation processes, namely for applications where it is necessary to initiate and/or maintain reactions between liquid and gaseous phases where an intimate admixture of all components is necessary for increasing the reacting interfaces, particularly in applications where two or more liquids which are not soluble in one another are to be admixed, and where catalytic reactions are to be obtained.

Figure 2:
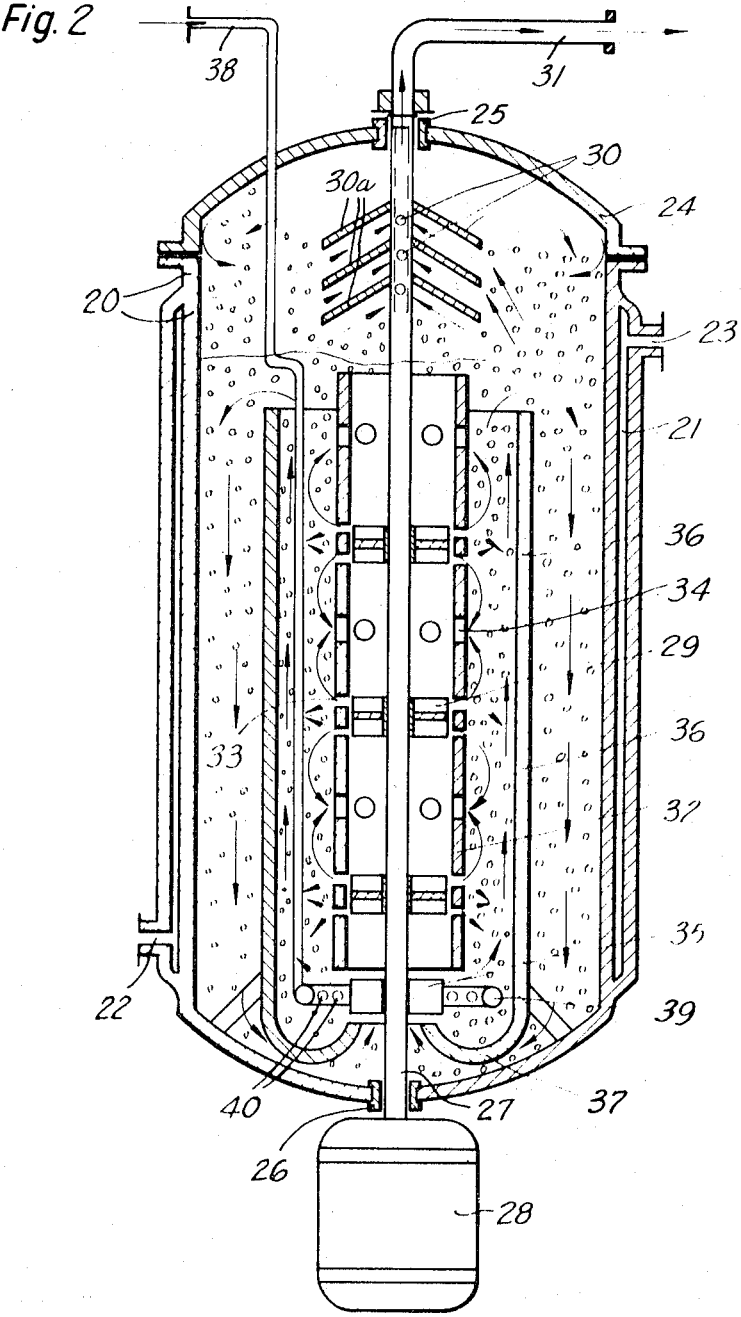
FIG. 2 is a view similar to that shown in FIG. 1, but showing a second embodiment.

Coming now to the embodiment illustrated in FIG. 2, it will be seen that this is relatively similar to the one illustrated in FIG. 1. The container is here identified with reference numeral 20 and is provided with a cooling jacket 21 with which the inlet and outlet conduits 22 and 23 communicate. A cover 24 overlies the open end of the receptacle 20 and closes the same. The rotatable shaft is identified with reference numeral 27 and is journaled in a first bearing 25 provided in the cover 24 and in a second bearing 26 provided in the bottom wall of the receptacle 20. The drive means 28 here is arranged below the receptacle 20 and it will of course be obvious that it is necessary to seal the bearing 26 in which the shaft 27 is journaled, against the escape of fluid.

The outer wall is identified with reference numeral 36 and the baffle is identified with reference numeral 32. Unlike the preceding embodiment, the lower end portion 32 of the outer wall 36, which end portion extends downwardly below the open end of the baffle 32, is bent arcuately inwardly as illustrated at 37. The baffle 32 is again provided with orifices, which in this embodiment are designated with reference numeral 33, and with the apertures located intermediate the orifices, here identified with reference numeral 34 and serving, as in the embodiment of FIG. 1, to aspirate mixture from the space between the baffle 32 and the outer wall 36 as indicated by the curved arrows. The shaft 27 carries agitating members 29 corresponding to the agitating member 26 illustrated in FIG. 1. The upper end of the shaft 27 is constructed as a hollow conduit 31 provided with inlet openings 30 through which the excess gas and the gaseous fermentation products can escape, and this conduit 31 thus is the counterpart of the outlet conduit 11 in FIG. 1. The upper end of the shaft 27 also carries a foam-dispersing structure 30a corresponding to the member 12 in FIG. 1, but here configurated as 3 superimposed conically tapering elements.

Unlike the embodiment illustrated in FIG. 1, the embodiment illustrated in FIG. 2 is provided with an inlet conduit 38 for the gaseous phase which enters into the interior of the container 20 through the cover 24 thereof and which communicates with an annular conduit 21 arranged downwardly of the lower open end of the baffle 32 but upwardly of the lower open end of the outer wall 36. The annular conduit 39 is arranged concentrically about the element 35 which corresponds to the element 13 of FIG. 1 and is provided for the same purpose as that element. The annular conduit 39 is provided with openings 40 through which the gaseous phase issues into the interior of container 20.

In the embodiment illustrated in FIG. 2, the issuing gas is forced to flow upwardly in the space between the baffle 32 and the outer wall 36 by the action of the member 35, that is again in the direction substantially normal to the jets issuing through the orifices 33, and at the upper end of the outer wall 36 the mixture of gas and liquid phase reverses direction, as indicated by the downwardly curved arrows, and circulates downwardly in the space between the outer wall 36 and the peripheral wall of the container 20. Thereupon, it flows upwardly, entering into the open end defined by the lower end portion 37 of the outer wall 36, and again rises within the confines of the outer wall 36 as described before.

Operation of the device illustrated in FIG. 2 is the same as that illustrated in FIG. 1, with the exception of the minor differences which have been enumerated.

My novel method disclosed herein is particularly well suited for carrying out fermentation processes in which large quantities of gases must be constantly maintained in the most intimate contact with the liquid phase, so as to obtain a reaction along relatively large connecting interfaces. Many such processes will readily come to mind for those skilled in this field, and these processes include for instance the production of proteins from natural gas and the like. However, and as already pointed out earlier, the very effective emulsifying action which my method exhibits on liquid, gaseous and pulverulent materials also makes it highly suitable for other applications in which a very intimate contact of the phases to be admixed is desired, such as in catalytic processes used in the manufacture of synthetic plastic materials, of fats, of petrochemicals (hydration processes) and in other applications of this nature.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended

I claim:

1. A method of intimately admixing a gaseous phase and a liquid phase, comprising the steps of confining a crude mixture of the gaseous phase and the liquid phase in an elongated tubular inner space and an annular outer space which surrounds and communicates with said inner space and is bounded by an outer wall; forcing fine jets of said crude mixture at high velocity and at longitudinally spaced fixed locations of said inner space from the latter into the mixture contained in said outer space so that such jets pass through the crude mixture in said outer space to impinge and rebound from said outer wall so as to become dispersed in said outer space, to thereby effect conversion of the crude mixture into an intimate mixture; and drawing streams of mixture at lower velocity from said outer space into said inner space at additional fixed locations intermediate said longitudinally spaced fixed locations.

2. A method as defined in claim 1; further comprising the steps of continuously circulating said mixture in said spaces.

3. A method as defined in claim 2, the step of circulating said mixture comprising circulating the mixture in said inner space in one axial direction and the mixture in said outer space in counterflow in the opposite axial direction.

4. A method as defined in claim 1, wherein said mixture extends in said spaces from a predetermined upper level to a predetermined lower level, and wherein said fixed locations are spaced from one another in direction intermediate said levels.

5. A method as defined in claim 4, wherein said fixed locations are also spaced from one another in circumferential direction of said spaces.

* * * * *